United States Patent [19]

Chang

[11] 4,230,063

[45] Oct. 28, 1980

[54] INFLATABLE AUTOMOBILE WARNING REFLECTOR

[76] Inventor: Donlly Chang, 1st Fl., 9-2, 20th St., Tien Mu 3rd Rd., Taipei, Taiwan

[21] Appl. No.: 39,762

[22] Filed: May 17, 1979

[51] Int. Cl.³ .................. B63C 9/20; E01F 9/04; G08G 1/00
[52] U.S. Cl. .................. 116/63 T; 9/313; 116/26; 116/210; 350/97
[58] Field of Search .............. 116/63 T, 63 P, 26; 9/313

[56] References Cited

U.S. PATENT DOCUMENTS

| | | | |
|---|---|---|---|
| 2,748,256 | 5/1956 | Moran | 250/97 X |
| 2,887,930 | 5/1959 | Zoffmann | 116/63 P |
| 3,113,551 | 12/1963 | Korn | 116/63 P |
| 3,322,093 | 5/1967 | Goland et al. | 116/63 T |
| 3,589,328 | 6/1971 | Kiniry | 116/63 T |
| 3,877,096 | 4/1975 | Scesney | 9/313 X |

*Primary Examiner*—Daniel M. Yasich
*Attorney, Agent, or Firm*—Robert E. Burns; Emmanuel J. Lobato; Bruce L. Adams

[57] ABSTRACT

An inflatable automobile warning reflector device, usable also as a floatation buoy, comprises an inflatable triangular body formed of three tubular sides joined at their ends to define a triangle. The front faces of the tubular sides forming the triangular body are covered with reflecting material. At two lower corners of the triangular body, inflatable L-shaped tubular supports project rearwardly to support the triangular body in an upright position on the ground and also to receive weights for anchoring the device. One leg of one of the supports serves as an inflating tube. A belt hook at the upper corner provides for hanging the device from a raised trunk lid of a car or other support.

4 Claims, 5 Drawing Figures

A—A SECTION

INFLATABLE AUTOMOBILE WARNING REFLECTOR

BACKGROUND OF THE INVENTION

Under the regulation of some governments, each automobile shall have a triangular warning reflector as an accessory. Furthermore, the size of the triangle is stipulated as a standard specification. The purpose of it is to prevent collision or traffic jam, for safety, by indicating a car in breakdown condition. However, in addition to the triangular reflector which has to meet the standard specification, warning reflector available in the market now is of simple structure for simple application, such as the foldable type which facilitates storing by its folding property. However, all of them are in solid structure made of plastic or metal. Though the application is simple, its prodution cost is rather high, and its cubic measure is bigger (L25×W5×H3), and must be put in trunk while not in use, therefore, it is inconvenient for timesaving. Nevertheless, a buyer may feel that he has no other choice since he has to comply with the government regulation and buy for safety purpose. This is the inconvenience from the high cost of the reflector due to the limit in structure.

SUMMARY OF THE INVENTION

The invention relates to a new structure of an automobile warning reflector especially a simple, practical and inflatable reflector structure. It comprises a triangular reflector, a support and a hook.

The invention is multi-purpose. The major objective is to provide a blow-up hose type of an inflatable automobile warning reflector which eliminates the above defects but still has a triangular reflector shape so that the application is simple, storing is easy, production cost is low and the effects are good. The second objective of the invention is to provide the user with a life buoy for use as a safety device in water as well as a recreation toy for sea-side playing.

As a whole, the invention is simple in structure, easy in production, low in cost, light in weight and easy in storing while it is folded and not in use. With the user blowing air a few times through a hose, then the body of the invention can be formed immediately. It is indeed an advanced, practical and new design of automobile warning reflector, and sometimes to be used as a life buoy.

Description for the structure and function is given with reference to the attached drawings.

DESCRIPTION OF THE PREFERRED EMBODIMENT

Figure 1:
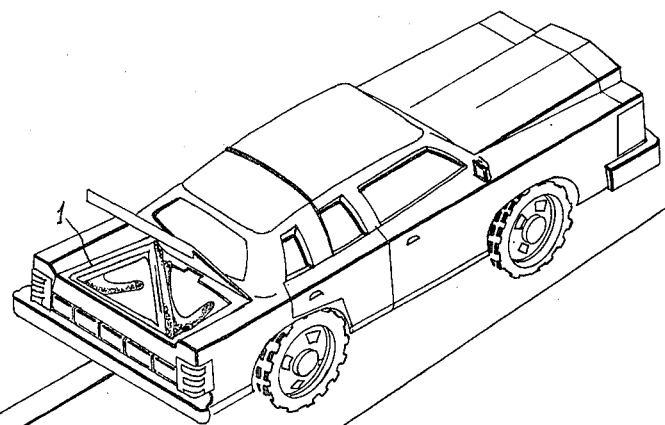
FIG. 1 is a drawing illustrating the application of the invention.
Figure 2:
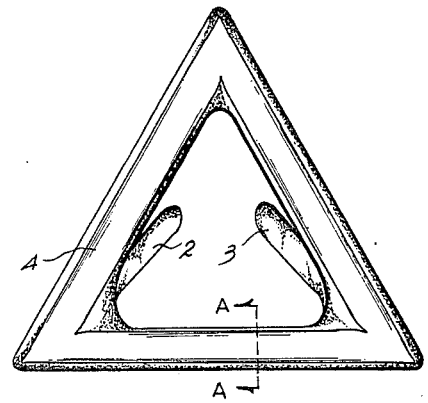
FIG. 2 is a drawing illustrating the invention in front view.
Figure 4:
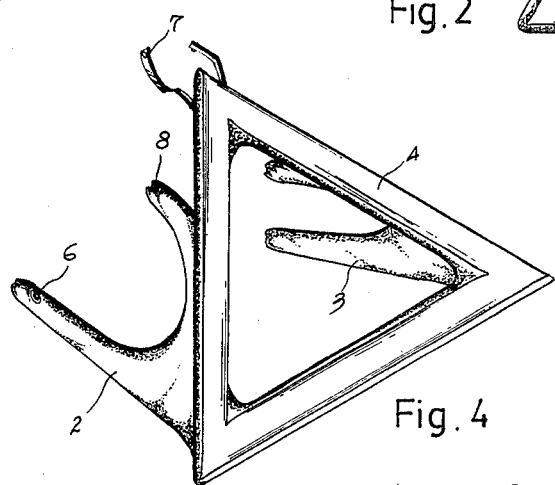
FIG. 4 is a three dimensional drawing of the invention.
Figure 3:
FIG. 3 is a cross section on the line A—A FIG. 2.
Figure 5:
FIG. 5 shows an application of the invention used as a life buoy while the user is in trouble in the water.

FIG. 1 shows two applications of the invention, including placing on the ground and hanging on a car. FIG. 2 is a front drawing of the invention. FIG. 3 illustrates the invention in sectional view. FIG. 4 is a three dimensional drawing of the invention. FIG. 5 shows an application of the invention used as a life buoy while the user is in trouble in the water. The invention is formed by ordinary ultrasonic thermal sealing method and the whole structure is very simple, wherein the inflatable part consists of a triangular reflector (1) and two L-type supports (2)(3) behind the said triangular reflector. Said triangular reflector (1) can be made under a certain control by an ultrasonic thermal sealing process so that the plastic material for the reflector (4) can be slightly thicker than other portion and has a smooth surface so that after reflective material (reflective paper) (5) is coated, it will have a good reflecting effect. Air inlet (6) is designed at an appropriate location on an L-type support other than the reflector. L-type supports (2)(3) and triangular reflector (1) are all related inflatable bodies. The L-type supports can be designed as an oblique section (8) structure and projected the three corners of said triangle to a common point and then a flatable body is formed. The whole body is inflated with air during application and then, the triangle (1) is supported in a vertical standing position. Since the whole structure is very light, it should be weighted with a heavy material available, such as repair tools when it was placed on ground so that it would be stable. A belt hook (7) can be designed at the top of triangular reflector (1) so that it can be hung at the trunk tip or the whole structure is held on the trunk to warn any car approaching it.

I claim:

1. An inflatable automobile warning reflector device usable also as a floatation buoy comprising an inflatable triangular body comprising three integral tubular straight sides joined at their ends to define a triangle, reflective material covering a front face of the triangular body formed by said tubular sides, and two integral L-shaped tubular inflatable supports projecting rearwardly from two lower corners of said triangular body to support said triangular body on a surface in an upright position and to receive weights for anchoring said body, and means for inflating said body and supports, said tubular sides forming said body and said supports all communicating with one another for common inflation.

2. An inflatable device according to claim 1, in which a leg of one of said L-shaped supports comprises an inflation tube for inflating said device by blowing air into said tube.

3. An inflatable device according to claim 1 or claim 2, further comprising a belt hook affixed to the upper corner of said triangular body for hanging said device from a car trunk lid or other support.

4. An inflatable device according to claim 1, in which said tubular sides are of approximately round cross-sectional shape.

* * * * *